UNITED STATES PATENT OFFICE.

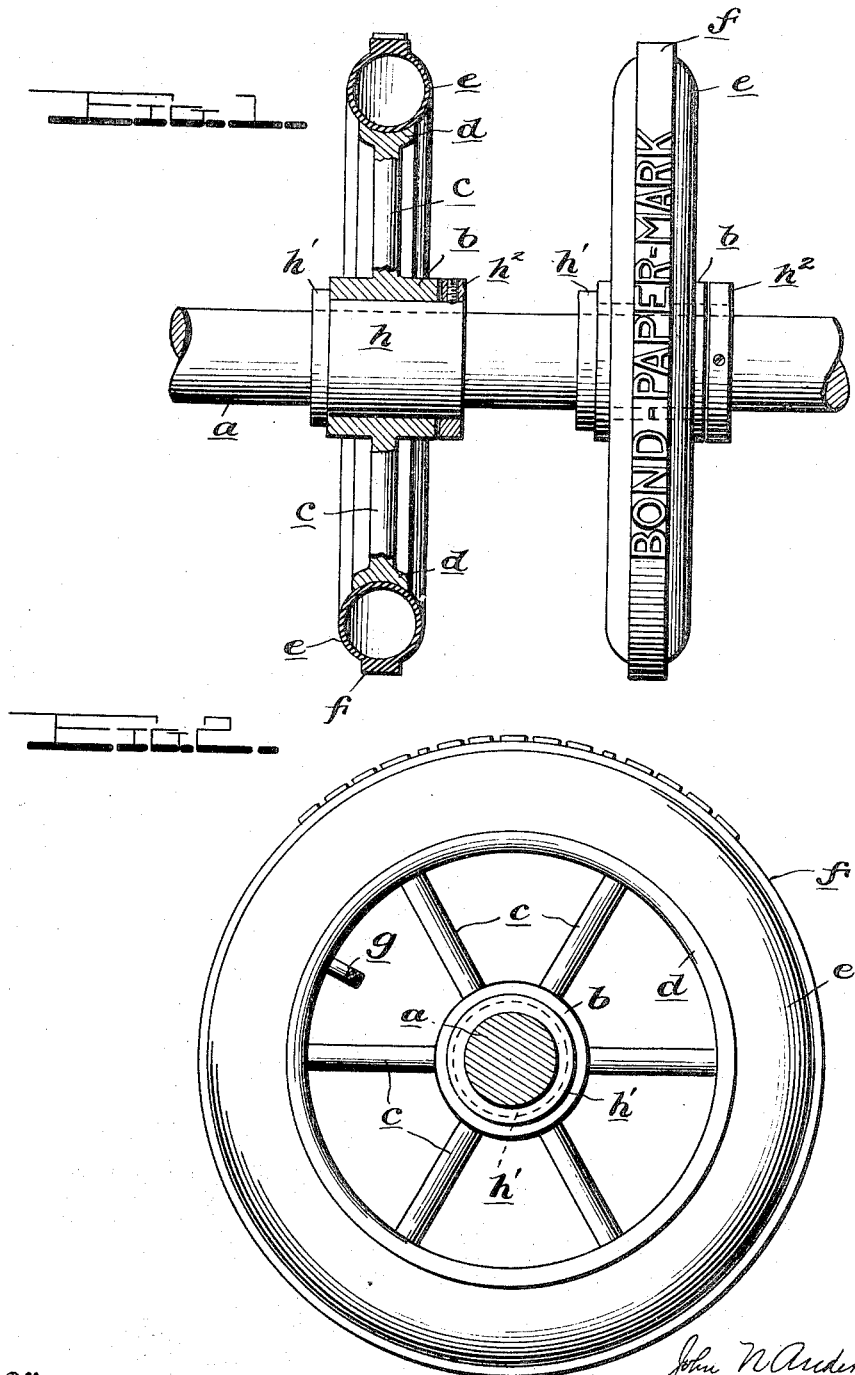

JOHN N. ANDERSON, OF LINCOLN, NEW HAMPSHIRE.

WATERMARKING APPLIANCE.

1,192,259.　　　　　Specification of Letters Patent.　　Patented July 25, 1916.

Application filed November 6, 1915. Serial No. 60,017.

*To all whom it may concern:*

Be it known that I, JOHN N. ANDERSON, a citizen of the United States of America, and a resident of Lincoln, county of Grafton, State of New Hampshire, have invented certain new and useful Improvements in Watermarking Appliances, of which the following is a full and clear specification, reference being had to the accompanying drawings, in which—

Figure 1 is a vertical sectional view and Fig. 2 is a side elevation of one of the wheels employed in my apparatus.

The object of this invention is to provide a simple contrivance whereby the marking can be accomplished with the least possible friction and pressure and also whereby when a series of wheels is employed the pressure may be regulated nicely, so as to avoid blurring the sheets, as more fully hereinafter set forth.

My appliance is intended to be used in the usual manner, namely, by impressing the marks into the sheet while the same is in its wet or pulp condition and while passing through the paper-making machine.

In the drawings, $a$ designates a shaft for supporting my marking wheels, this shaft being supported in the machine in any suitable manner and being driven in the usual way. On this shaft I mount one or more marking wheels, each of which consists of a hub $b$, radial spokes $c$, a rim $d$, and a continuous pneumatic tire $e$ affixed to the rim and provided with a tread $f$ which is adapted to receive the lettering or other marking characters. The tire $e$ is of any suitable flexible material and is adapted to be inflated through a tire valve $g$ of the usual construction. The wheels may be attached to the shaft $a$ in any suitable manner, but I prefer to mount them upon a brass sleeve $h$ and confine them against a shoulder $h'$ at one end thereof by means of a removable set collar $h^2$. The wheel may rotate freely on the sleeve, in which case it will, of course, be unnecessary to rotate the shaft $a$, or, as preferred, the wheel may be affixed to the sleeve and the sleeve be affixed to the shaft, in which case the shaft will be positively rotated by the usual mechanism. The sleeve may be made slidable along the shaft for the purpose of adjusting the several wheels with respect to each other. It will be observed that when the tires or annular tubes $e$ are inflated with air, the pressure on the wet sheets will be resilient, and by varying the degree of pressure in the tube, the pressure and friction on the wet sheet may be adjusted to suit conditions, to thereby avoid blurring the sheet and to cause the production of a clear mark in the sheet. When a series of wheels is employed, the pressure in each tire tube may be nicely adjusted independently to suit the conditions of the work.

Having thus described my invention, what I claim is:

1. A water-marking wheel embodying an annular pneumatic tire-like tube having on its tread surface water-marking characters.

2. A water-marking wheel embodying an annular pneumatic tire-like tube having on its tread surface water-marking characters, means being provided for varying the pressure in said tube.

In testimony whereof I hereunto affix my signature.

JOHN N. ANDERSON.

Copies of this patent may be obtained for five cents each, by addressing the "Commissioner of Patents, Washington, D. C."